United States Patent
Szolyga et al.

(10) Patent No.: US 7,702,895 B2
(45) Date of Patent: Apr. 20, 2010

(54) METHOD FOR CONFIGURATING A COMPUTING SYSTEM

(75) Inventors: Thomas H. Szolyga, Saratoga, CA (US); Jean-Paul Moiroux, Las Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 934 days.

(21) Appl. No.: 11/103,817

(22) Filed: Apr. 12, 2005

(65) Prior Publication Data

US 2006/0230260 A1 Oct. 12, 2006

(51) Int. Cl.
*G06F 9/24* (2006.01)
*G06F 15/177* (2006.01)

(52) U.S. Cl. .............................. 713/2; 713/1; 713/100; 711/154

(58) Field of Classification Search ..................... 713/2, 713/1, 100; 711/154
See application file for complete search history.

(56) References Cited

U.S. PATENT DOCUMENTS

| | | | | |
|---|---|---|---|---|
| 4,922,448 | A * | 5/1990 | Kunieda et al. | 713/320 |
| 5,555,156 | A * | 9/1996 | Decante | 361/683 |
| 2004/0021669 | A1* | 2/2004 | Fredlund et al. | 345/530 |
| 2005/0005076 | A1* | 1/2005 | Lasser | 711/154 |
| 2006/0103531 | A1* | 5/2006 | Chevreau et al. | 340/572.1 |

* cited by examiner

*Primary Examiner*—Thomas Lee
*Assistant Examiner*—Michael J Brown

(57) ABSTRACT

A method for configuring a computing system having a processing unit and at least one application subsystem for enabling the processing unit to perform system functions, includes packaging the system processing unit in a first housing, and at least one subsystem of the computing system in a second housing separate from and external to the first housing. The second housing is configured to visibly identify the subsystem contained within. The processing unit and the subsystem are connected with a communication link.

18 Claims, 3 Drawing Sheets

METHOD FOR CONFIGURATING A COMPUTING SYSTEM

FIELD OF INVENTION

The present invention relates to computing systems, and in particular to configuration of various components of a computing system.

BACKGROUND OF THE INVENTION

Computer or processor systems are typically packaged in a single box, or housing, including the CPU and the memory and the key subsystems such as a storage device and a graphics system (see FIG. 6). PCs, for example, have a graphics card plugged directly into a motherboard slot buried deep in the system chassis. A display in the form of a monitor, or data input devices such as a keyboard and a mouse are provided as separate units from the box housing the CPU and the key subsystems. Replacement of any of the subsystems requires opening the box containing these components. Most consumers or users are not qualified or knowledgeable enough to replace any of the components within the box.

Also, there is no easily recognizable difference between product (subsystem) families, within product families, or between product family members included in known computer systems. Customers would have to read point-of-sale material to understand the different components used in the system.

Some manufacturers of these systems use a logo or a sticker containing a phrase to indicate the kind of components that are inside the box. Examples are an "Intel Inside®" logo or the nVidia® "The way its meant to be Played™" sticker. These methods are not immediately obvious, especially to the retail consumer. The consumer must find the logo or sticker on the unit and read it to understand the capabilities of the PC.

A concept of a "Three Second Sales Pitch" means that within three seconds of seeing the product, the consumer will realize the advantages of this product over competitive products. On the point-of-sale material that accompany the product, the difference in wording might be only a model number. For example, the customer would read "9600XT" and "9800" and must realize that "9600XT" is better than "9800". Unless the customer is familiar with both types of models, he or she would not be able to distinguish between the two models.

SUMMARY OF THE INVENTION

The present invention is directed to a method for configuring a computing system having a processing unit and at least one application subsystem which is configured to enable the processing unit to perform various system functions. The method includes packaging the system processing unit in a first housing, and at least one subsystem in a second housing separate from and external to the first housing. The second housing is configured to visibly identify the subsystem contained therein. The processing unit and the subsystem are connected with a communication link.

DETAILED DESCRIPTION OF THE INVENTION

Broadly stated, the present invention is directed to a method for configuring the components of computer or processor systems such as, for example, PCs and servers. The method involves packaging the subsystem such as a graphics system or a mass storage system separately from the main system such as the CPU and the memory, and highlighting or distinguishing the subsystem capabilities by using unique color, shape, form, texture or lighting on the chassis or package containing the subsystem. In this manner, a user or buyer can instantly recognize the capabilities of the system without reading the point-of-sale information, and make the buying decision much easier. Separately packaging the subsystems from the main system also offers the added advantage of providing a cooling solution by separating the source of heat, i.e., the CPU from the graphics systems or the mass storage system.

Figure 1:
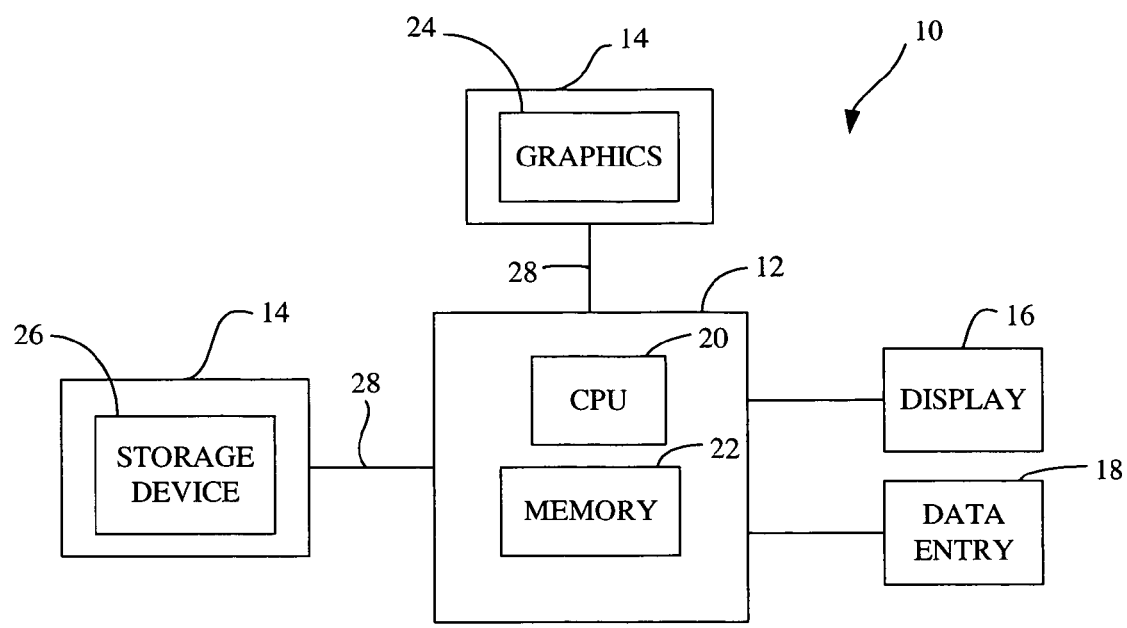
FIG. 1 is a block diagram illustrating one embodiment of a computing system in accordance with the present invention.

Turning now to FIG. 1, a computing system 10 in accordance with one embodiment of the present invention includes a main system box, or housing, 12, a plurality of subsystem boxes, or housings, 14 (two shown), a display 16 and a data entry device 18. The main system box 12 houses a central processing unit (CPU) 20 for operating the overall system functions, and a memory 22 such as a RAM or a ROM accessed by the CPU in performing the system functions. The subsystem boxes 14 house key subsystems such as a graphics system 24 or a storage device 26 that are integral and interdependent with the CPU 20 for performing the system functions (in other words, the CPU 20 performs the overall system functions only when the CPU is operatively connected to the graphics system 24 or storage device 26). In other words, the subsystems contemplated in this invention have the design features that enable the subsystems to work together with a particular type of CPU 20 in the system 10. In contrast, the display 16 and the data entry devices 18, which may be a monitor or a keyboard, respectively, are stand-alone devices that may be connected to any arbitrary main system of a computing system 10.

The subsystem boxes 14 are containers or chassis that are physically separate from the main system box 12, which is also a container or chassis, and are in communication with the CPU 20 of the main housing via a communication link such as PCI Express, for example. Accordingly, both the main system box 12 and the subsystem boxes 14 have connection slots for connecting PCI Express connectors 28. The communication connection between the main system box 12 and the subsystem boxes 14 may also be made through any other high speed serial communication means, such as Ethernet.

In one embodiment of the present invention, the computing system 10 is a PC. However, the present invention may be applicable to any other computing devices such as a workstation which include at least the CPU 20 and any other dedicated subsystems.

Figure 2:
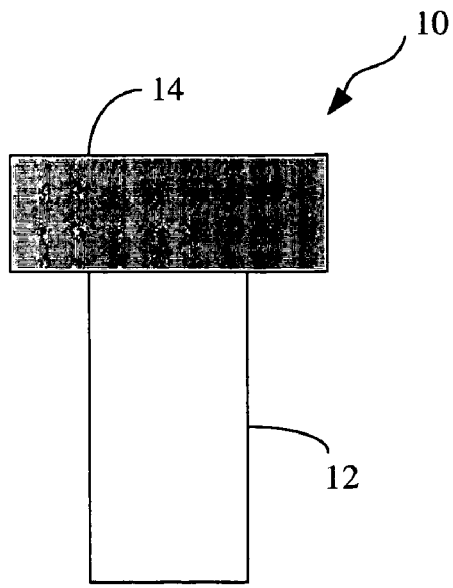
FIG. 2 shows one manner of configuring a main system and a subsystem of the computing system of FIG. 1.
Figure 3:
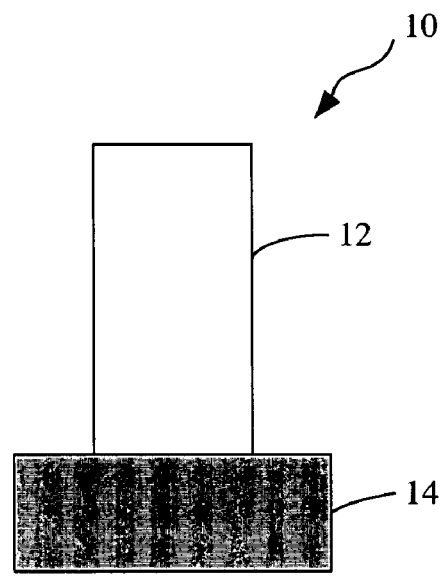
FIG. 3 shows another manner of configuring the main system and a subsystem of the computing system of FIG. 1.
Figure 4:
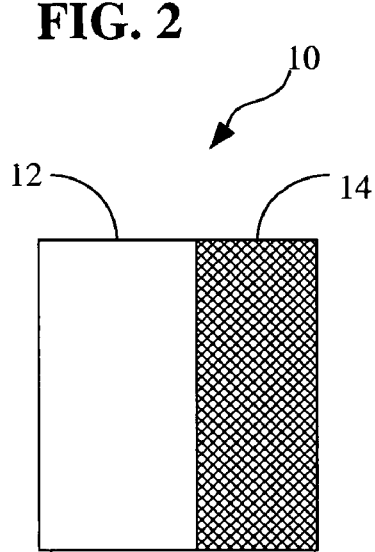
FIG. 4 shows yet another manner of configuring the main system and a subsystem of the computing system of FIG. 1.
Figure 5:
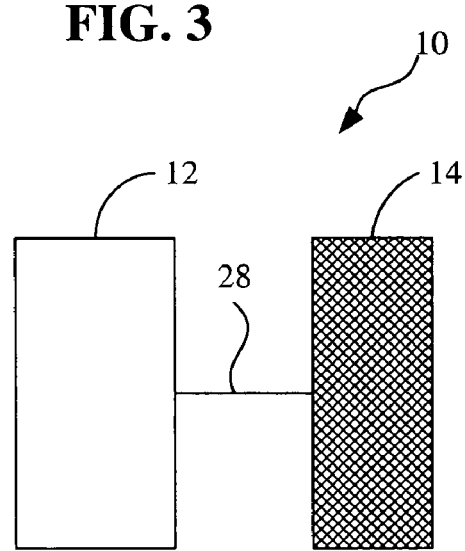
FIG. 5 shows still another manner of configuring the main system and a subsystem of the computing system of FIG. 1.
Figure 6:
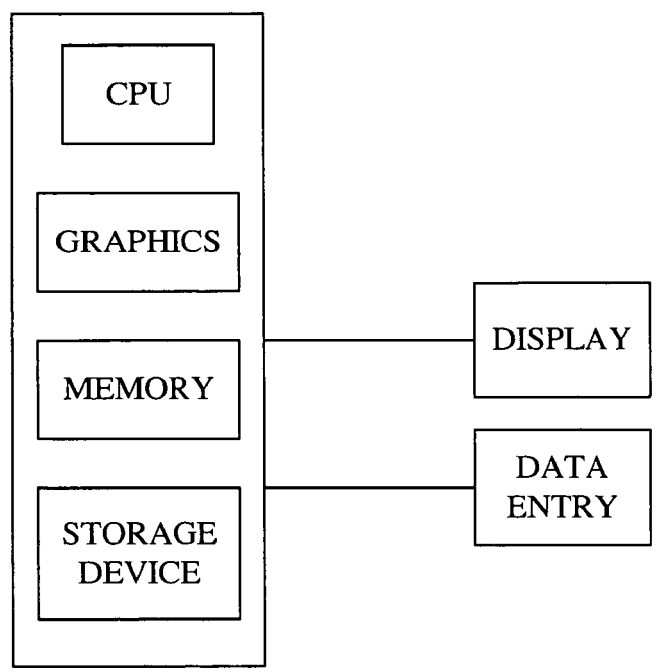
FIG. 6 is a block diagram illustrating a computer or processor system, typically packaged in a single box, or housing, including the CPU and the memory and the key subsystems such as a storage device and a graphics system.

Turning now to FIG. 2, the computing system 10 shown in FIG. 1 is configured and arranged to be displayed in a manner which would enable a user to readily recognize the subsystem of the computer system 10. In FIG. 2, the main system housing 12 is a "tower" PC and the subsystem box 14 is provided on top of the main system box. Alternatively, the subsystem box 14 can be provided under the main system box 12, as shown in FIG. 3. Another arrangement of the subsystem box 14 with the main system box 12 would be to place the boxes 12, 14 next to each other as shown in FIG. 4. Alternatively, the subsystem box 14 may be separated from the main system box 12, and connected with the connector 28, as shown in FIG. 5. When the subsystem box 14 is attached to the main system box 12, the boxes may have connection slots so that they dock with each other.

In accordance with the present invention, the subsystem box 14 of the present invention includes visibly identifiable characteristics, so that the consumer or user can recognize the capabilities of the subsystem from the appearance of the subsystem box 14. For example, the subsystem box 14 housing a particular model of the storage device 26 or the graphics system 24 may have a unique texture that allows the user or consumer to readily recognize its model and its capabilities. Other identifiable characteristics of the subsystem box 14 may include shapes and colors, for example.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for configuring a computing system having a central processing unit and a memory, comprising:
    packaging the central processing unit and the memory in a first housing, wherein the central processing unit accesses the memory to perform overall system functions of the computing system;
    packaging at least one subsystem of the computing system in a second housing separate from and external to said first housing, wherein said second housing has a predefined characteristic that visibly identifies a model of said at least one subsystem such that the model indicates compatibility with a particular type of central processing unit, wherein the at least one subsystem is designed to work together with the particular type of central processing unit; and
    connecting said central processing unit with said at least one subsystem with at least one communication link;
    wherein said central processing unit is interdependent with the at least one subsystem such that the central processing unit performs the overall system functions only when operatively connected to said at least one subsystem.

2. The method as defined in claim 1 wherein said second housing is configured to be removably attached to said first housing.

3. The method as defined in claim 1, wherein model of said subsystem is identified by a shape, color or texture of the second housing.

4. The method as defined in claim 1, wherein said second housing is adapted to be provided on top of and in contact with said first housing.

5. The method as defined in claim 1, wherein said first housing is adapted to be provided on the top of and in contact with said second housing.

6. The method as defined in claim 1, wherein said second housing is configured to be provided on a side of and in contact with said first housing.

7. The method as defined in claim 1, wherein said second housing is configured to be physically separated from said first housing.

8. The method as defined in claim 1, wherein said at least one subsystem is one or more of a graphics system and a mass storage system.

9. A computing system, comprising:
    a first housing for packaging at least a central processing unit which performs overall system functions of the computing system;
    at least one second housing for packaging at least one subsystem configured to enable said central processing unit to perform the overall system functions of the computing system, said at least one second packaging being separate from and external to said first housing, wherein said second housing has a predefined characteristic that visibly identifies a model of said at least one subsystem such that the model indicates compatibility with a particular type of central processing unit, wherein the at least one subsystem is designed to work together with the particular type of central processing unit; and
    a communication link for connecting said central processing unit with said at least one subsystem;
    wherein said central processing unit is interdependent with said at least one subsystem such that said central processing unit performs the overall system functions only when operatively connected to said at least one subsystem.

10. The system as defined in claim 9, wherein said at least one subsystem is a graphics system or a data storage system.

11. The system as defined in claim 9, wherein said communication link is a PCI Express connection.

12. The system as defined in claim 9, further comprising data input/output device communicatively connected to said first housing.

13. The system as defined in claim 9, wherein said second housing is configured and adapted to be removably secured to said first housing.

14. The system as defined in claim 9, wherein said model of said subsystem is identified by a shape, color, or texture of said second housing.

15. The system as defined in claim 9, wherein said second housing is adapted to be provided on top of and in contact with said first housing.

16. The system as defined in claim 9, wherein said first housing is adapted to be provided on the top of and in contact with second housing.

17. The system as defined in claim 9, wherein said second housing is adapted to be provided on a side of and in contact with said first housing.

18. The system as defined in claim 9, wherein said second housing is adapted to be physically separated from said first housing.

* * * * *

UNITED STATES PATENT AND TRADEMARK OFFICE
CERTIFICATE OF CORRECTION

PATENT NO. : 7,702,895 B2
APPLICATION NO. : 11/103817
DATED : April 20, 2010
INVENTOR(S) : Thomas H. Szolyga et al.

Page 1 of 1

It is certified that error appears in the above-identified patent and that said Letters Patent is hereby corrected as shown below:

On the Title Page, Item (54), Title, line 1, delete "CONFIGURATING" and insert -- CONFIGURING --, therefor.

In column 1, line 1, delete "CONFIGURATING" and insert -- CONFIGURING --, therefor.

In column 4, line 40, in Claim 12, after "comprising" insert -- a --.

Signed and Sealed this

Fifth Day of October, 2010

David J. Kappos
*Director of the United States Patent and Trademark Office*